United States Patent
Siebenmorgen et al.

(10) Patent No.: US 10,620,419 B2
(45) Date of Patent: Apr. 14, 2020

(54) ARRANGEMENT FOR LIGHT SHEET MICROSCOPY

(71) Applicant: Carl Zeiss Microscopy GmbH, Jena (DE)

(72) Inventors: Jörg Siebenmorgen, Jena (DE); Thomas Kalkbrenner, Jena (DE); Helmut Lippert, Jena (DE)

(73) Assignee: Carl Zeiss Microscopy GmbH, Jena (DE)

(*) Notice: Subject to any disclaimer, the term of this patent is extended or adjusted under 35 U.S.C. 154(b) by 0 days.

(21) Appl. No.: 14/904,062

(22) PCT Filed: Jul. 8, 2014

(86) PCT No.: PCT/EP2014/064550
§ 371 (c)(1),
(2) Date: Jan. 8, 2016

(87) PCT Pub. No.: WO2015/004107
PCT Pub. Date: Jan. 15, 2015

(65) Prior Publication Data
US 2016/0170195 A1    Jun. 16, 2016

(30) Foreign Application Priority Data
Jul. 10, 2013  (DE) .................. 10 2013 107 298

(51) Int. Cl.
*G02B 21/34*     (2006.01)
*G02B 21/16*     (2006.01)
(Continued)

(52) U.S. Cl.
CPC .......... *G02B 21/34* (2013.01); *G02B 21/0032* (2013.01); *G02B 21/06* (2013.01);
(Continued)

(58) Field of Classification Search
CPC .............. G02B 21/002; G02B 21/0032; G02B 21/0048; G02B 21/0056; G02B 21/06;
(Continued)

(56) References Cited

U.S. PATENT DOCUMENTS 8,482,854 B2     7/2013   Lippert et al.
2010/0067104 A1  3/2010   Lippert et al.
(Continued)

FOREIGN PATENT DOCUMENTS

DE         102 57 423         6/2004
DE       10 2007 015 061      10/2008
(Continued)

OTHER PUBLICATIONS

Notification of Transmittal of Translation of the International Preliminary Report on Patentability dated Jan. 12, 2016.
(Continued)

*Primary Examiner* — Thomas K Pham
*Assistant Examiner* — Ibrahima Diedhiou
(74) *Attorney, Agent, or Firm* — Haug Partners LLP

(57) ABSTRACT

An arrangement for light sheet microscopy including: a sample vessel, for receiving a medium containing sample, having a covering and being oriented with respect to a planar reference surface; illumination optics with an illumination objective for illuminating the sample with a light sheet; and detection optics with a detection objective. The optical axis of the illumination objective and the light sheet lies in a plane that forms a nonzero illumination angle with the normal of the reference surface. The optical axis of the detection objective forms a nonzero detection angle with the normal of the reference surface. A bulge is formed at the covering for receiving the sample. The bulge has inner and outer interfaces. The optical axes of the illumination objective and detection objective form a minimal angle with the
(Continued)

normals of the interfaces at least in the region where the optical axes pass through the interfaces.

19 Claims, 2 Drawing Sheets

(51) Int. Cl.
*G02B 21/36* (2006.01)
*G02B 21/00* (2006.01)
*G02B 21/06* (2006.01)
*G02B 21/26* (2006.01)
*G02B 27/00* (2006.01)

(52) U.S. Cl.
CPC .............. *G02B 21/16* (2013.01); *G02B 21/26* (2013.01); *G02B 21/367* (2013.01); *G02B 27/0068* (2013.01)

(58) Field of Classification Search
CPC .... G02B 21/0076; G02B 21/16; G02B 21/26; G02B 21/33; G02B 21/34; G02B 21/367; G02B 27/0068; G01N 1/2813; G01N 1/4077; G01N 15/0618; G01N 2015/144; G01N 2015/1445; G01N 2015/1452; G01N 2021/0346; G01N 21/0303; G01N 21/05; G01N 21/6452; G01N 21/6458; B01L 2200/027; B01L 2300/0829; B01L 2300/0877; B01L 2300/161; B01L 2400/0457; B01L 3/5025; B01L 3/5027; B01L 3/502746; B01L 3/5085; C12M 23/02; C12M 23/12; C12M 23/22; Y10S 436/809
USPC ........ 359/368, 385, 398, 370, 374; 356/244, 356/246, 318, 450, 904; 382/128; 422/68.1; 436/63, 172, 809; 250/458.1, 250/459.1
See application file for complete search history.

(56) References Cited

U.S. PATENT DOCUMENTS

| 2010/0239138 | A1* | 9/2010 | Lippert | G02B 21/34 382/128 |
| 2012/0219985 | A1 | 8/2012 | Yoon et al. | |
| 2012/0275658 | A1 | 11/2012 | Hurley et al. | |
| 2014/0126046 | A1* | 5/2014 | Shroff | G02B 21/06 359/385 |

FOREIGN PATENT DOCUMENTS

| DE | 10 2007 015061 | 10/2008 | |
| DE | 10 2007 048 409 | 4/2009 | |
| DE | 10 2008 027 784 | 12/2009 | |
| DE | 10 2012 108 158 | 3/2014 | |
| EP | 0 866 993 | 9/1998 | |
| EP | 2 587 295 | 5/2013 | |
| JP | 2000019099 A * | 1/2000 | ......... G01N 21/0303 |
| JP | 2013-097380 | 5/2013 | |
| WO | WO 2004/053558 | 6/2004 | |
| WO | WO 2012/110488 | 8/2012 | |
| WO | WO 2012/122027 | 9/2012 | |

OTHER PUBLICATIONS

Reynaud E. G. et al., "Light sheet-based fluorescence microscopy: more dimensions, more photons, and less photodamage", H F S P Journal: Fontiers of Interdisciplinary Research in the Life Sciences, International Human Frontier Science Program Organization, FR, Bd. 2, Nr. 5, Oct. 1, 2008 (Oct. 1, 2008), Seiten 266-275, XP008129341, ISSN: 1955-2068.

N. Jährling et al., "Ultramicroscopy â a novel light sheet based imaging technique created by various research disciplines; Ultramikroskopie â eine neue bildgebende Technotogie auf Basis von Laser Light-Sheets, entwickelt in Zusammenarbeit mehrerer Forschungsdisziplinen", E & I Elektrotechnik Und Informationstechnik, Springer-Verlag, Vienna, Bd. 128, Nr. 10, Oct. 1, 2011 (Oct. 1, 2011), Seiten 352-358, XP019983407, ISSN: 1613-7620.

"Selective Plane Illumination Microscopy Techniques in Developmental Biology" by J. Huisken et al., published in 2009 in the journal *Development*, vol. 136, p. 1963.

"Optical thin-film materials with low refractive index for broadband elimination of Fresnel reflection", by J.-Q. Xi et al., Published in 2007 in *Nature Photonics*, vol. 1, pp. 176-179.

International Search Report and Written Opinion for Application No. PCT/EP2014/064550 dated Oct. 13, 2014.

German Search Report dated Jul. 1, 2014.

Emmauel G. Reynaud et al. , "*Light sheet-based fluorescence microscopy: more dimensions, more photons, and less photodamage*", HFSP Journal, Oct. 2008, vol. 2, No. 5, p. 266-275.

* cited by examiner

ARRANGEMENT FOR LIGHT SHEET MICROSCOPY

The present application claims priority from PCT Patent Application No. PCT/EP2014/064550 filed on Jul. 8, 2014, which claims priority from German Patent Application No. DE 10 2013 107 298.4 filed on Jul. 10, 2013, the disclosures of which are incorporated herein by reference in their entirety.

FIELD OF THE INVENTION

It is noted that citation or identification of any document in this application is not an admission that such document is available as prior art to the present invention.

The invention is directed to an arrangement for light sheet microscopy. An arrangement of this kind includes a sample vessel for receiving a sample that is located in a medium, this sample vessel being oriented with respect to a planar, usually horizontal, reference surface. The arrangement further includes illumination optics with an illumination objective for illuminating the sample with a light sheet, and the optical axis of the illumination objective and the light sheet lie in a plane which forms an illumination angle β not equal to zero with the normal of the reference surface. Finally, the arrangement for light sheet microscopy also comprises detection optics with a detection objective having an optical axis which forms a detection δ not equal to zero with the normal of the reference surface. The illumination objective and detection objective can also be configured as a so-called double-objective such as is described, for example, in EP 0 866 993 B1. In this case, the two objectives are put together in a shared constructional unit, and the respective optics—i.e., objectives with associated beam paths and optical elements arranged therein share some elements.

An arrangement of this type is used particularly in the examination of biological samples in which the sample is illuminated by a light sheet, the plane of which intersects the optical axis of detection at an angle not equal to zero. The light sheet typically forms a right angle with the detection direction which generally corresponds to the optical axis of the detection objective. Spatial recordings of even thick samples can be made relatively quickly with this technique, also referred to as SPIM (selective plane illumination microscopy). A graphic, spatially extensive representation of the sample is made possible based on optical sections combined with a relative movement in a direction perpendicular to the section plane.

The SPIM technique is preferably used in fluorescence microscopy, where it is accordingly also referred to as LSFM (light sheet fluorescence microscopy). The LSFM technique has a number of advantages over other established methods such as confocal laser scanning microscopy or two-photon microscopy. Since widefield detection can be carried out, larger sample regions can be acquired. Although the resolution is somewhat lower than in confocal laser scanning microscopy, the LSFM technique can be used to analyze thicker samples because the penetration depth is greater. Further, this method has the least light stress on the samples, which, among other things, reduces the risk of photobleaching of a sample because the sample is only illuminated by a thin light sheet at an angle to the detection direction not equal to zero.

Instead of using a purely static light sheet, a quasistatic light sheet can also be generated through fast scanning of the sample with a light beam. The light sheet-type illumination is brought about in that the light beam undergoes a very fast relative movement with respect to the sample to be observed and is thus strung together over and over in a temporally consecutive manner. The integration time of the camera on whose sensor the sample is ultimately imaged is selected such that the scanning is concluded within the integration time. Instead of a camera with a two-dimensional array, a line sensor combined with a renewed scanning (rescan) can also be used in the detection optics. Further, confocal detection can also be carried out.

The SPIM technique has been described many times in the literature, for example, in DE 102 57 423 A1 and in WO 2004/053558 A1 which is based on the latter, and in the survey article "Selective Plane Illumination Microscopy Techniques in Developmental Biology" by J. Huisken et al. published in 2009 in the journal *Development*, vol. 136, p. 1963.

One of the chief applications of light sheet microscopy is for imaging intermediate-sized organisms having a size of some hundreds of micrometers to a few millimeters. Generally, these organisms are embedded in an agarose gel which is located in turn in a glass capillary. The glass capillary is inserted from above or below into a sample chamber filled with water, and the sample is pushed some distance out of the capillary. The sample in the agarose is illuminated by a light sheet and the fluorescence is imaged on a camera by a detection objective oriented perpendicular to the light sheet and, therefore, also perpendicular to the light sheet optics.

This method of light sheet microscopy has three sizable disadvantages. For one, the samples to be examined are relatively large and derive from developmental biology. Further, because of the sample preparation and the dimensions of the sample chamber, the light sheet is relatively thick and accordingly limits the attainable axial resolution. In addition, the sample preparation is complicated and is not compatible with standardized sample preparations or standardized sample holders such as are conventionally used in fluorescence microscopy for individual cells.

In order to circumvent these limitations at least partially, a SPIM construction was recently developed in which the illumination objective and the detection objective are perpendicular to one another and are directed onto the sample from above at an angle of 45° in each instance. When, for example, the specimen stage on which the sample holder is fixed or some other horizontal plane is used as reference surface, the illumination angle β and the detection angle δ are both 45°. A construction of this kind is described, for example, in WO 2012/110488A2 and WO2012/122027A2.

In a construction such as this, the sample is located, for example, on the bottom of a petri dish. The petri dish is filled with water, and the illumination objective and detection objective are immersed in the liquid which also takes on the function of an immersion medium. This approach offers the advantage of higher resolution in axial direction, since a thinner light sheet can be generated. Smaller samples can then also be examined owing to the higher resolution. Sample preparation is also made significantly easier. The great drawback still consists in that the sample preparation and sample holder still do not correspond to the standard mentioned above. Accordingly, the petri dish must be relatively large so that the two objectives can be immersed in the dish without hitting the edge of the dish. Microtiter plates—also known as multi-well plates—which are standard in many branches of biology and in fluorescence microscopy analysis of individual cells cannot be used with this method because the objectives cannot be immersed in the very small wells of the plate. Further, this method has the disadvantage that it is not readily possible to analyze a large number of samples in a short period of time (high-throughput screening) because the objectives must be cleaned when changing samples in order to avoid contaminating the different samples.

SUMMARY OF THE INVENTION

It is the object of the invention to further develop an arrangement for light sheet microscopy of the type described in the introduction such that high-throughput analysis of samples is facilitated in that the use of microtiter plates, i.e., sample holders which can receive a large number of samples, is facilitated.

This object is met for an arrangement for light sheet microscopy of the type described in the introduction in that at least one bulge which is at least partially transparent to illumination light and detection light is formed at the covering for receiving the sample, this bulge having an inner interface and an outer interface. This substantially facilitates access of the objectives to the sample. In particular, microtiter plates as well as rotatable microtiter plates—can be used, and the wells of these microtiter plates can then be configured with smaller lateral dimensions than if the sample were located at the vessel bottom, particularly when an upright microscope configuration is used for the analysis.

In this respect, it is key that the shape of the bulge, the position of the bulge during observation, and the location of the optical axes of the illumination objective and detection objective are adapted to one another in order to prevent or minimize aberrations which would result when a beam path extends obliquely through the interfaces and, therefore, when light enters and exits the sample vessel obliquely. The adaptation is carried out in such a way that the optical axes of the illumination objective and detection objective form a minimal angle with the normals of the inner interface and outer interface at least in the region where the optical axes pass through the interfaces, i.e., an angle which is equal to zero or only deviates from zero by a few degrees, approximately up to 5°. If the optical axes and the interfaces are perpendicular to one another, only spherical aberrations occur which can be corrected as in known microscope objectives adapted to coverslips.

In principle, the bulge can have any shape provided that the above-mentioned condition is met. For example, the bulge can have a half-barrel shape or half-sphere shape, in which case the optical axes of the two objectives coincide with normals to tangents at the surface of the half-barrel in the best possible configuration of the adapted arrangement.

In a particularly preferred embodiment, the at least one bulge comprises two plate-shaped elements which project from the covering and sample vessel and which have parallel interfaces which, at that place on the bulge located at the greatest distance from the rest of the sample vessel—which, in case the bulge is formed as a depression, is the lowest point of the depression and, in case the bulge is formed as a protuberance, is the highest point of the protuberance—make contact at at least one point and, at this point, the depression or the protuberance and the sample vessel or the vessel cover, respectively, terminate at the bottom or at the top. In the region where the optical axis of the illumination objective passes through, the normals of the interfaces of a first plate-shaped element coincide with this optical axis such that the normals and the optical axis are parallel to the optical axis of the illumination objective at every location on the interfaces of the plate-shaped element. Correspondingly, the normals of the interfaces of a second plate-shaped element coincide with the optical axis of the detection objective, i.e., are parallel to this optical axis at every location on the interfaces of the second plate-shaped element. This allows a greater flexibility for adapting with respect to the position of the bulge in relation to the two objectives. However, the plate shape which implies a parallel attitude of the inner interface and outer interface with respect to one another is not compulsory and, particularly in the region where the two plate-shaped elements make contact, this region can be provided with a small curvature on the inner side such that, on the one hand, e.g., in case of a depression, the depression is strengthened at its lowest point and, on the other hand, a stubborn adherence of impurities which would occur when two plane plates abut at an angle, i.e., in the case of a depression with an at least partially V-shaped cross section, is also prevented.

The sum of the illumination angle $\beta$ and detection angle $\delta$ is preferably 90°, which facilitates the arrangement of a detector in the beam path. At other angles, it must be ensured that the image plane, i.e., the plane in which the detector is situated, intersects the object plane, i.e., the plane irradiated by the light sheet, and the object-side principal plane of the detection objective in a straight line.

The at least one bulge can be channel-shaped, and a plurality of channels can be arranged one behind the other in the sample vessel, for example, in the vessel bottom. In a particularly preferred embodiment, the bulge is pyramid-shaped so that the two plate-shaped elements have a triangular shape and are supplemented by two further plate-shaped elements. This makes it possible to analyze a sample located in the bulge from four different sides, which can be advantageous when the sample attaches to one side. In addition, pyramid-shaped bulges can be arranged in grid shape at the vessel bottom or in the vessel cover such that the sample vessel can also be configured as a microtiter plate with a plurality of pyramid-shaped bulges of this kind. The channel-shaped configuration can also be utilized for a microtiter plate when the individual channels are divided into individual sections by partitioning elements such as crosspieces.

A sample vessel with a depression of the type mentioned above can be made of glass but, in a more economical variant, can also be made of plastic, e.g., by means of a deep drawing process, when the depression is channel-shaped.

At least a portion of the inner interface of the bulge is advisably functionalized for growing cells on this interface, i.e., it is coated with a special structure to which the surface structures of the cells adhere and are anchored. For individual cells which are to be analyzed in high throughput with the present light sheet microscope arrangement, the growth conditions can be even better adapted to the natural growth environment in that the at least one bulge, i.e., for example, a channel or pyramid-shaped depression, is filled with a gel or alginate by which a spatial matrix can be simulated.

As has already been indicated, in a preferred embodiment in which the illumination objective and detection objective are arranged below the sample vessel in an inverted configuration, the covering is formed as vessel bottom and the bulge is formed as depression in the vessel bottom. In this way, the access of the objective to the sample is substantially facilitated. In particular, microtiter plates with a plurality of wells can also be used, and a depression for a sample is formed in each of these wells. The use of a depression or depressions for examining many cell samples makes it possible to increase the quantity of wells in a sample vessel because the lateral dimensions—in the plane of the reference surface—can be reduced.

In an upright configuration of the light sheet microscope, i.e., for observing from above, the vessel cover instead of the vessel bottom can also be adapted as covering in a manner analogous to that described for the vessel bottom, and the analysis of cells can be carried out with an upright light sheet microscopy arrangement. Therefore, in this embodiment of the invention, the illumination objective and detection objective are arranged above the sample vessel. In this case, at least one protuberance is formed in the vessel cover instead of a depression. The shape of the protuberance, the position of the protuberance during observation, and the location of the optical axes of the illumination objective and detection objective are then likewise adapted to one another in that the optical axes of the illumination objective and detection objective form a minimal angle with the normals of the interfaces at least in the region where the optical axes pass through the interfaces. Like the depressions, the protuberances can be channel-shaped, pyramid-shaped, half-barrel-shaped or half-sphere-shaped.

In view of the fact that in microtiter plates the sample usually sinks owing to gravity or settles at the lowest point, observation is not readily possible when the illumination objective and detection objective are arranged above the sample vessel. For this reason, when the protuberances are formed in the vessel cover, additional means for positioning the sample in the upper region of the sample vessel with respect to the depth thereof are arranged in the sample vessel within the working distance of the objectives. The means for positioning can also be arranged in the vessel cover, also within the working distance of the objectives in a corresponding manner. The working distance for typical objectives with a high numerical aperture usually ranges from a few hundred micrometers to several millimeters.

Depressions or protuberances can be formed of plate-shaped elements, and the inner interfaces can be functionalized. A further possibility for configuring the sample vessel consists in using a rotatable microtiter plate in which, first of all, the protuberances in the cover face downward. The sample is placed in this protuberance, which corresponds to a depression in the charging position, and is fixed therein by the means for positioning the sample in the at least one protuberance, for example, by means of a plunger. Subsequently, the bottom is placed on the rotatable microtiter plate from above and the microtiter plate is closed. For purposes of analysis, this microtiter plate is then rotated when it is to be used with an upright light sheet microscope. Rotation is not required when it is to be used with an inverted light sheet microscope.

The means for positioning the sample in the top one fourth or in the at least one protuberance in the vessel cover advisably comprise a membrane which is permeable to nutrient solutions, a platform with a plurality of openings, or a strip. It is important that the sample makes contact with the nutrient solution in every case, but it may not sink into this nutrient solution due to gravity. The membrane, the platform or the strip can also be made of gel.

Due to the fact that the light passes through three different media or two interfaces between each objective and the sample, spherical aberrations also occur with vertical orientation of the objectives with respect to the interfaces. Knowing the material for the bulge in the shape of a depression in the vessel bottom or in the shape of a protuberance in the vessel cover and knowing the thickness at least of plate-shaped elements with parallel interfaces, these aberrations can be corrected in the manner commonly implemented for microscope objectives. In some cases, they are corrected with respect to a specified coverslip thickness of a specified material. Corrections of this type are particularly preferably carried out in the detection objective, which generally has a higher numerical aperture than the illumination objective.

In a preferred embodiment, the illumination optics and/or detection optics include corrective means for reducing not only the above-mentioned aberrations, but also aberrations resulting from the passage of illumination light and/or light to be detected through the interfaces at an angle other than 90°.

Therefore, special corrective lenses are preferably arranged in the illumination objective and/or in the detection objective. In case the objectives form an angle not equal to zero with the normals of the interfaces, these corrective lenses can also include cylindrical lenses, tilted lenses or lenses which are not arranged on the optical axes. Corrective elements with aspherical surfaces or free-form surfaces can also be utilized for correction. Alternatively or in addition, corrective means in the form of adaptive optical elements can be arranged in the illumination beam path for manipulating the phase fronts of the illumination light and/or detection light. In this connection, deformable mirrors, spatial light modulators or phase plates are preferably used.

Another method for reducing aberrations is to use specially adapted materials for the covering or for the protuberances in the vessel cover or depressions in the vessel bottom.

In a particularly preferred embodiment, materials having a refractive index that differs by less than 5% from the refractive index of the medium in which the sample is located are used as material for the depression or protuberance in the vessel bottom or vessel cover, respectively. For example, when water, which has a refractive index $n_d=1.33$ at a wavelength $\lambda_d=578.56$ nm, is used as medium in which the sample is located, examples of suitable material for the covering are PTFE (polytetrafluoroethylene, $n_d=1.35$), CYTOP® ($n_d=1.34$) or PFEP (fluorinated ethylene propylene, $n_d=1.34$). Perfluorodioxolane polymers which likewise have a refractive index generally between 1.33 and 1.36 can also be used. Teflon® AF which usually has a refractive index $n_d=1.32$ is also a particularly well-suited material. This material is an amorphous polymer. In this case, the glass transition temperature can be adjusted in such a way that the polymer in cooled state has the refractive index of the medium in which the sample is located. Other amorphous polymers having an adjustable glass transition temperature can also be used, of course.

If the refractive indices do not coincide exactly, aberrations continue to occur, although to a lesser degree. Therefore, in order to further prevent these aberrations, the bulge should be as thin as possible and should be no thicker than some hundreds of micrometers. If the covering serves simultaneously as the bottom of the sample vessel, as is the case with an inverted arrangement, a sufficient stability must, of course, be ensured with respect to the pressure exerted by the medium in which the sample is located. This is not necessary when the covering serves as cover of the sample vessel for upright observation. In this case, the material can be shaped in a substantially thinner manner with thicknesses of less than 100 μm.

In a further step which is easily implemented particularly in upright light sheet microscopy, immersion objectives can again be used. If the same medium is used both as immersion medium and as medium for receiving the sample, i.e., water, for example, and the refractive index of water, and if a material is used for the protuberances or depressions in the vessel cover or vessel bottom that has a refractive index almost identical to that of water, there is no noticeable scatter or refraction on the interfaces, and the objectives need not be corrected further.

A nanostructured mix material composed of a first component and a second component can also be used as material for the protuberances and depressions in the vessel cover and in the vessel bottom. The refractive index of the first component is less than the refractive index of the medium for receiving the sample, and the refractive index of the second component is greater than the refractive index of the medium for receiving the sample. If the mean structure size of the material of the first component is less than the light wavelengths of the light which is to be used for illumination and which is to be detected, there results an effective refractive index for the mix material which can likewise be adapted to the refractive index of the medium depending on the size of the regions and quantity of regions so that the refractive index is in the range of 5% around the refractive index of the medium for embedding the sample. For example, nanoporous silicon dioxide can be used. In this case, the first component is air and the second component is silicon dioxide. These kinds of nanostructured materials are described in connection with the production of antireflective layers, for example, in the article "Optical thin-film materials with low refractive index for broadband elimination of Fresnel reflection", by J.-Q. Xi et al., published in 2007 in *Nature Photonics*, Vol. 1, pages 176-179.

It will be appreciated that the features mentioned above and those to be described hereinafter can be used not only in the indicated combinations but also in other combinations or individually without departing from the scope of the present invention.

The invention will be described more fully in the following by way of example with reference to the accompanying drawings which also disclose key features of the invention.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
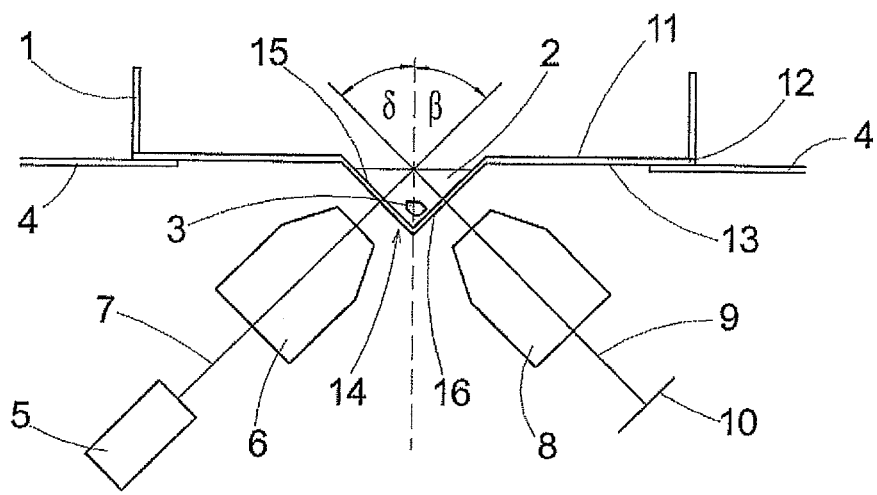
FIG. 1 shows an arrangement for light sheet microscopy.

First, FIG. 1 shows the basic construction of an arrangement for light sheet microscopy which allows easy access to the sample to be examined and therefore meets the prerequisite for use in high-throughput analysis of individual cells. The arrangement is configured in the present instance as an inverted light sheet microscope, but can easily be transferred to an upright light sheet microscope. A sample 3 is located in a medium 2 in a sample vessel 1. The sample vessel 1 is oriented with respect to a planar reference surface which is defined in this case by the horizontal surface of a specimen stage 4. The arrangement further includes illumination optics with a light source 5 and an illumination objective 6 for illuminating the sample 3 with a light sheet. The light sheet and the optical axis 7 of the illumination objective 6 lie in a plane which forms an illumination angle $\beta$ not equal to zero with the normals of the reference surface. Light coming from the sample is imaged on a detector 10 via detection optics having a detection objective 8 with optical axis 9 forming a detection angle $\delta$ not equal to zero with the normals of the reference surface. The detector 10 transforms the registered intensity into image data which can be further processed. The illumination angle $\beta$ and detection angle $\delta$ are identical in the present case, but this is not compulsory. For example, when the apertures of the two objectives differ, the angles can also be adjusted differently based on the space requirement.

The illumination objective 6 and detection objective 8 are arranged below the sample vessel 1. The sample vessel 1 has a vessel bottom 11 which is transparent to illumination light and detection light and which has an inner interface 12 and an outer interface 13. At least one depression 14 which is transparent to illumination light and detection light is formed at the vessel bottom 11 for depositing the sample 3 into the depression. In this connection, it is sufficient when the sample vessel 1 is transparent in the region of the depression 14, but it is generally simpler to produce it from a uniform material such as glass or deep-drawn plastic. By depositing the sample 3 in this depression 14, the sample 3 is more easily accessible to the optical arrangement of the light sheet microscope, the illumination objective 6 and the detection objective 8. A sample vessel 1 with a plurality of depressions 14 of this type is better suited for a high-throughput analysis of individual cells than a vessel with a flat bottom, since the individual wells in a multi-well plate or microtiter plate of this kind can have smaller lateral dimensions because the sample is deposited in the depression. Therefore, the microtiter plates need not be changed as often.

The shape of the depression 14, the position of the depression 14 during observation, and the locations of the optical axes 7 and 9 of the illumination objective 6 and detection objective 8 are adapted to one another in that these optical axes 7, 9 of the illumination objective 6 and detection objective 8 form a minimal angle with the normals of the inner interface 12 and outer interface 13 at least in the region where optical axes 7 and 9 pass through interfaces 12 and 13. The occurrence of aberrations resulting from light impinging on and exiting obliquely through the interfaces can be minimized in this way. The angle is preferably zero.

In the example shown in FIG. 1, the at least one depression 14 has a first plate-shaped element 15 and a second plate-shaped element 16 projecting from the vessel bottom 11. The inner interface 12 is arranged parallel to the outer interface 13 in each of the plate-shaped elements 15 and 16. At the lowest point of the depression 14, the two plate-shaped elements 15 and 16 contact at at least one point, the normals of the interfaces 12, 13 of the first plate-shaped element 15 coincide with the optical axis 7 of the illumination objective 6, and the normals of the interfaces 12, 13 of the second plate-shaped element 16 coincide with the optical axis 9 of the detection objective 8. The sum of the illumination angle $\beta$ and detection angle $\delta$ is 90° in the present instance, but can also deviate from this. This arrangement has the great advantage that aberrations such as can occur when light passes obliquely through the interfaces 12, 13 can be entirely prevented. Further corrections of the illumination objective 6, which generally has a small numerical aperture on the order of 0.3, are no longer necessary because the light sheet to be generated should be as thin as possible. However, further corrections are advantageous for the detection objective 8 which generally has a high numerical aperture on the order of 1.0 and in certain cases also for the illumination objective. The corrective means can comprise, for example, corrective lenses in the illumination objective 6 or in the detection objective 8, or adaptive optical elements for manipulating the phase fronts of the illumination light and/or detection light which are arranged in the illumination beam path or in the detection beam path and are preferably configured as deformable mirrors, spatial light modulators or phase plates.

To completely eliminate scattering and refraction at interfaces 12, 13, the vessel bottom 11 can also be shaped from a material which has a refractive index which differs by less than 5% from the refractive index of the medium 2 in which the sample 3 is located. Amorphous polymers having glass transition temperatures which can be adjusted such that, when cooled, the material has exactly the required refractive index are particularly suitable for this purpose. A nanostructured mix material formed, for example, from nanoporous silicon dioxide, i.e., silicon dioxide with a plurality of cylindrical holes, can also be used as material for the vessel bottom 11. In every case, the vessel bottom 11 should be as thin as possible in order to suppress aberrations as far as possible. The example shown in FIG. 1 can also be transferred in an equivalent manner to an upright arrangement of the illumination objective 6 and detection objective 8, in which case, instead of a depression 14 in the vessel bottom 11, the vessel cover has a corresponding protuberance.

Figure 2:
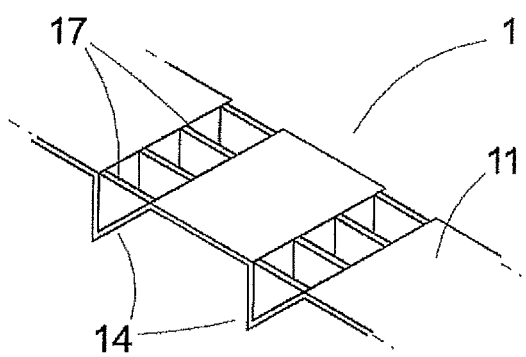
FIG. 2 shows an example of a sample vessel with depressions.

FIG. 2 shows an example for a sample vessel 1 which is suitable for high-throughput analysis of cells. Two channel-shaped depression 14 arranged parallel to one another are shown in a section of a sample vessel 1. Each of these depressions 14 is divided by crosspieces 17 into individual wells which make it possible to arrange a plurality of samples next to one another in a depression 14 without the possibility of mutual contamination.

Figure 3:
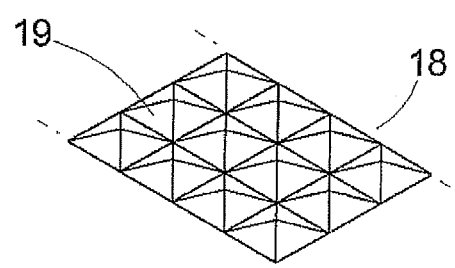
FIG. 3 shows an example of a vessel cover or vessel bottom.

Instead of the vessel bottom 11, a corresponding vessel cover 18 can also be configured in this way. FIG. 3 shows a section from a vessel cover 11 on which are arranged a plurality of pyramid-shaped protuberances 19, each of which covers a well in the sample vessel 1. In an equivalent manner, the vessel bottom 1 can also be configured in this way.

The outer interfaces 13 in the depressions 14 or protuberances 19 can be functionalized for growing cells on this interface such that, for example, cells can also attach to the protuberances 19 without additional aid. The depression 14 or the protuberance 19 can also be filled with a gel or alginate to immobilize the sample.

Figure 4:
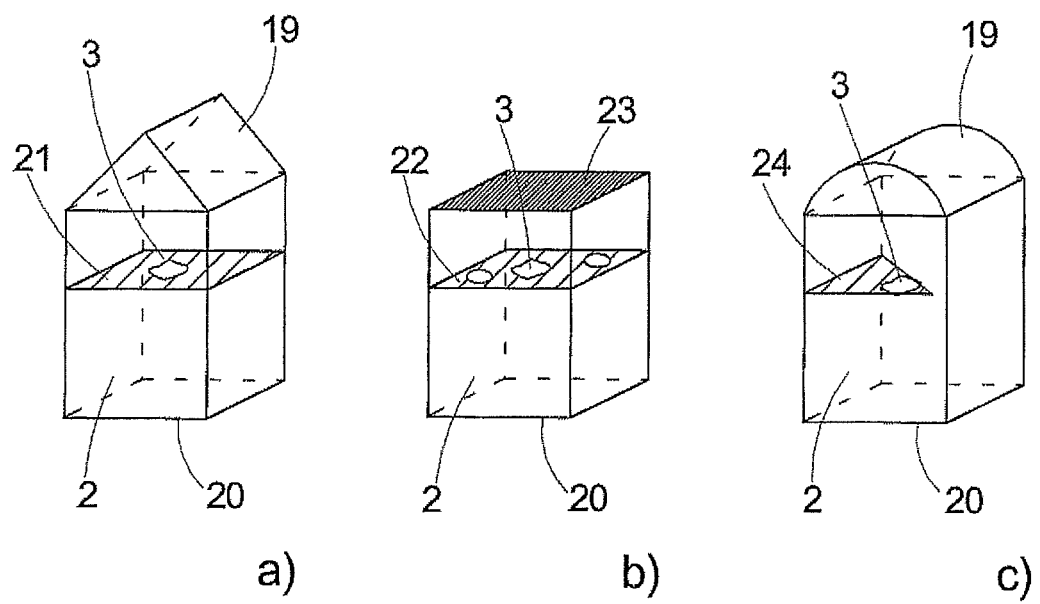
FIGS. 4 a)-c) show various possibilities for arranging a sample in the upper region of a well of a microtiter plate.

To facilitate observation of the samples and to allow the wells of a microtiter plate to be designed with the smallest possible lateral diameter, sample vessels of this type which are provided for upright observation preferably have means for positioning the sample in the upper region of the sample vessel 1 with respect to depth within the working distance of the illumination objective and detection objective or for corresponding positioning within the working distance in the protuberance 19 in the vessel cover 18. These means are shown in FIGS. 4a)-c). The box-shaped element represents a well 20 in a multi-well plate in a sample vessel 1 for upright observation. In FIG. 4 a), a permeable membrane 21 is arranged in the upper region, the sample 3 being supported thereon. This permeable membrane 21 ensures contact with a comparatively large volume of nutrient fluid to enable the growth of the cells. The membrane 21 allows diffusion of nutrients and also supports the sample 3. A platform 22, which is flat, for example, and which has openings as is shown in FIG. 4 b) can also be used instead of a membrane 21. The platform can be made of glass, for example, so that the sample preparation can proceed substantially in accordance with standard protocols. The cell culture can also be immobilized in a matrix gel. In FIG. 4 a), a protuberance 19 of a vessel cover 18 in the form of a channel or section of a channel is shown on the well 20. The use of a flat covering, for example, a sheet 23, as is shown in FIG. 4 b), is also possible in principle. The sheet 23 can be glued or welded to the sample vessel. A further configuration is shown in FIG. 4 c) which illustrates a strip 24 projecting into the center of the well. In this instance, the protuberance 19 has a half-barrel shape. The supporting elements mentioned above, membrane 21, platform 22 and strip 24, can also be made of gel provided it possesses sufficient rigidity.

Figure 5:
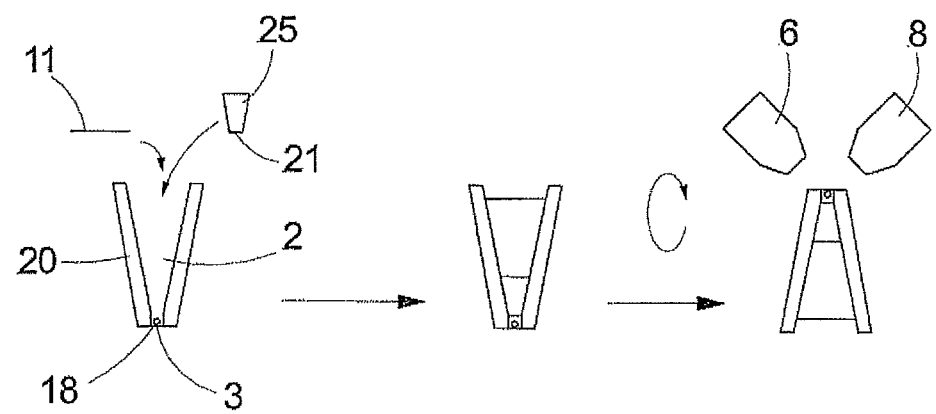
FIG. 5 shows the use of a rotatable microtiter plate.

The use of rotatable microtiter plates as is shown in FIG. 5 is also conceivable. In this case, the sample 3 is first placed in a well 20 of the microtiter plate. The well 20 is funnel-shaped in the present instance by way of example. The well 20 is filled with the medium 2. Subsequently, a funnel-shaped element 25 having a membrane 21 at its smaller-diameter end is inserted into the funnel-shaped well 20. The microtiter plate is then closed by the vessel bottom 11. Subsequently, the plate is rotated, and the sample can then be observed with an upright arrangement for light sheet microscopy.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claim.

LIST OF REFERENCE NUMERALS 1 sample vessel
2 medium
3 sample
4 specimen stage
5 light source
6 illumination objective
7 optical axis
8 detection objective
9 optical axis
10 detector
11 vessel bottom
12 inner interface
13 outer interface
14 depression
15 first plate-shaped element
16 second plate-shaped element
17 crosspiece
18 vessel cover
19 protuberance
20 well
21 membrane
22 platform
23 sheet 24 strip
25 funnel-shaped element

The invention claimed is:
1. An arrangement for light sheet microscopy comprising:
a sample vessel for receiving a sample that is located in a medium, the sample vessel having a covering and being oriented with respect to a planar reference surface;
illumination optics with an illumination objective for illuminating the sample with a light sheet; and
detection optics with a detection objective;
wherein an illumination optical axis of the illumination objective and the light sheet lies in a plane which forms a nonzero illumination angle β with a normal of the reference surface;
wherein a detection optical axis of the detection objective forms a nonzero detection angle δ with the normal of the reference surface;
wherein at least one bulge, which is transparent to illumination light and detection light, is formed at the covering;
wherein the bulge has an inner surface and an outer surface for receiving the sample in the bulge;
wherein a shape of the at least one bulge, a position of the bulge during observation, and a location of the illumination and detection optical axes are selected so that the illumination and detection optical axes form a minimal angle of from 0° to 5° with the normals of the inner and outer surfaces of the bulge at least in a region where the illumination and detection optical axes pass through the surfaces;
wherein the at least one bulge comprises:
first plate-shaped element; and
a second plate-shaped element;
wherein each of the plate-shaped elements projects from the covering and from the sample wherein each of the plate-shaped elements projects from the covering and from the sample vessel;
wherein each of the plate-shaped elements have parallel, planar inner and outer surfaces;
wherein, at an inner place on the bulge located at a greatest distance from the rest of the sample vessel, the inner surface of the first plate-shaped element and the inner surface of the second plate-shaped element make contact at at least one point;
wherein, at an outer place on the bulge located at a greatest distance from the rest of the sample vessel, the outer surface of the first plate-shaped element and the outer surface the second plate-shaped element make contact at at least one point;
wherein normals of the inner and outer surfaces of the first plate-shaped element coincide with the illumination optical axis of the illumination objective; and
wherein normals of the inner and outer surfaces of the second plate-shaped element coincide with the detection optical axis of the detection objective.

2. The arrangement for light sheet microscopy according to claim 1;
wherein the at least one bulge is channel-shaped or pyramid-shaped.

3. The arrangement for light sheet microscopy according to claim 1;
wherein the inner surface of the at least one bulge is functionalized for the growth of cells.

4. The arrangement for light sheet microscopy according to claim 1;
wherein:
the illumination objective and detection objective are arranged below the sample vessel;
the covering is formed as vessel bottom; and
the at least one bulge is formed as a depression.

5. The arrangement for light sheet microscopy according to claim 4;
wherein the sample vessel is formed as microtiter plate with a plurality of bulges formed as wells, and a pyramid-shaped depression is formed at each well.

6. The arrangement for light sheet microscopy according to claim 4;
wherein the depression is filled with a gel or alginate.

7. The arrangement for light sheet microscopy according to claim 1;
wherein:
the illumination objective and detection objective are arranged above the sample vessel;
the covering is formed as a vessel cover; and
the at least one bulge is formed as a protuberance; and
wherein the arrangement further comprises a means for positioning the sample in an upper region of the sample vessel or the protuberance with respect to a depth, the means being arranged in the sample vessel within a working distance of the illumination objective and detection objective.

8. The arrangement for light sheet microscopy according to claim 7;
wherein the sample vessel is formed as microtiter plate with a plurality of pyramid-shaped protuberances in the vessel cover.

9. The arrangement for light sheet microscopy according to claim 8;
wherein the microtiter plate is formed so as to be rotatable.

10. The arrangement for light sheet microscopy according to claim 7;
wherein the means for positioning the sample in the upper region of the sample vessel or the protuberance comprises a membrane that is permeable to nutrient solutions, a platform with a plurality of openings, or a strip.

11. The arrangement for light sheet microscopy according to claim 10;
wherein the membrane, the platform, or the strip is made of gel.

12. The arrangement for light sheet microscopy according to claim 1;
wherein the illumination optics, the detection optics, or both include a corrective means for reducing aberrations resulting from the oblique passage of illumination light and/or light to be detected through the surfaces.

13. The arrangement for light sheet microscopy according to claim 12;
wherein the corrective means includes corrective lenses in the illumination objective and/or in the detection objective.

14. The arrangement for light sheet microscopy according to claim 1;
wherein the vessel bottom and/or the vessel cover are/is made of a material having a refractive index that differs by less than 5% from a refractive index of the medium in which the sample is located.

15. The arrangement for light sheet microscopy according to claim 14;
wherein the material comprises a nanostructured mix material comprising:
a first component; and
a second component;

wherein a refractive index of the first component is less than the refractive index of the medium, and a refractive index of the second component is greater than the refractive index of the medium; and wherein mean structure sizes of regions of material of the first component have a mean diameter that is less than the light wavelengths of the light which is to be used for illumination and which is to be detected.

16. The arrangement for light sheet microscopy according to claim 1;

wherein a sum of the illumination angle $\beta$ and detection angle $\delta$ is 90°.

17. The arrangement for light sheet microscopy according to claim 13;

wherein the corrective lenses comprise cylindrical lenses, tilted lenses, or lenses that are not arranged axially.

18. The arrangement for light sheet microscopy according to claim 12;

wherein the corrective means includes:

corrective elements with aspherical surfaces or with free-form surfaces; or adaptive optical elements arranged in the illumination beam path, in the detection beam path, or in both for manipulating phase fronts of the illumination light and/or detection light; or a combination thereof.

19. The arrangement for light sheet microscopy according to claim 18;

wherein the corrective means includes the adaptive optical elements; and wherein the adaptive optical elements comprise deformable mirrors, spatial light modulators, phase plates, or a combination thereof.

* * * * *